May 29, 1962 G. G. MARRA 3,036,947
METHOD OF LAMINATING WOOD TIMBERS
Filed Sept. 28, 1959 4 Sheets-Sheet 1
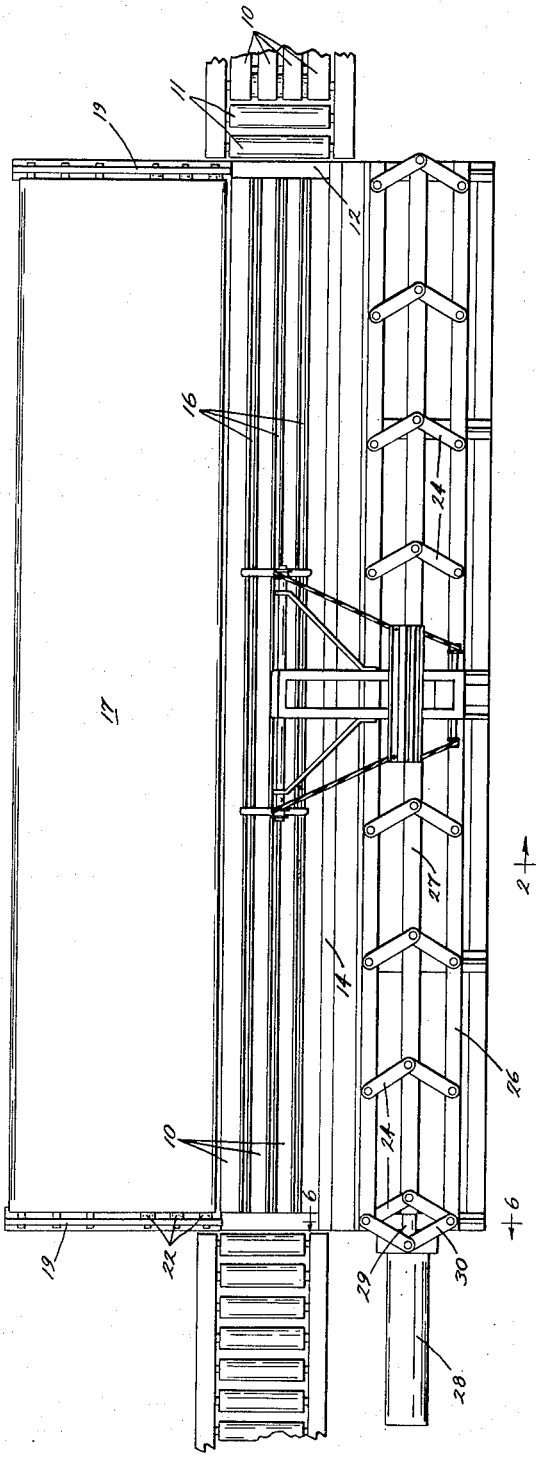
INVENTOR.
George G. Marra
BY
Atty.

May 29, 1962
G. G. MARRA
3,036,947
METHOD OF LAMINATING WOOD TIMBERS
Filed Sept. 28, 1959
4 Sheets-Sheet 2
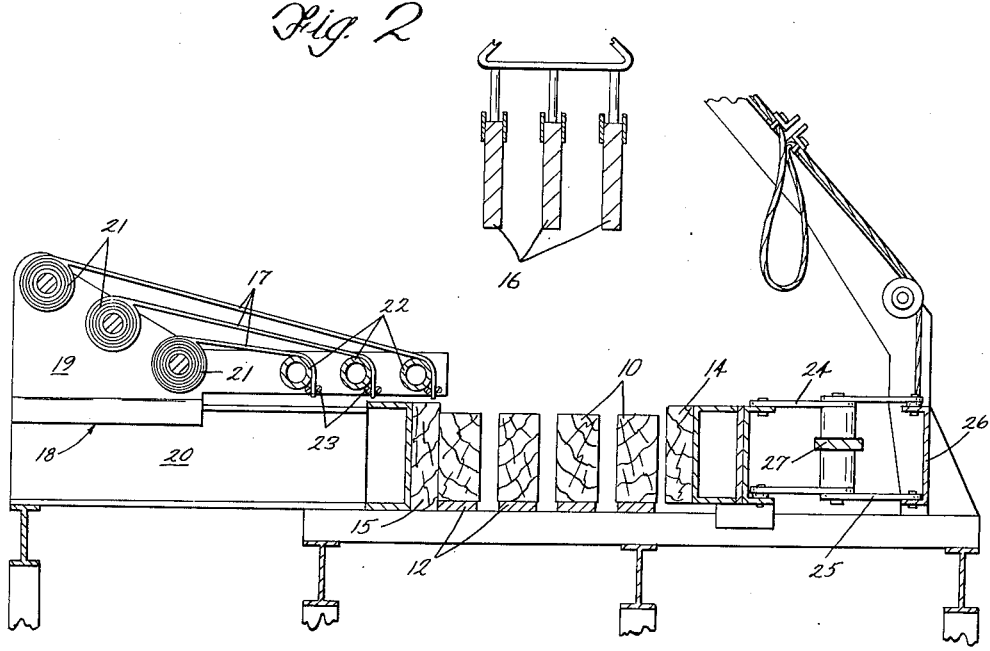
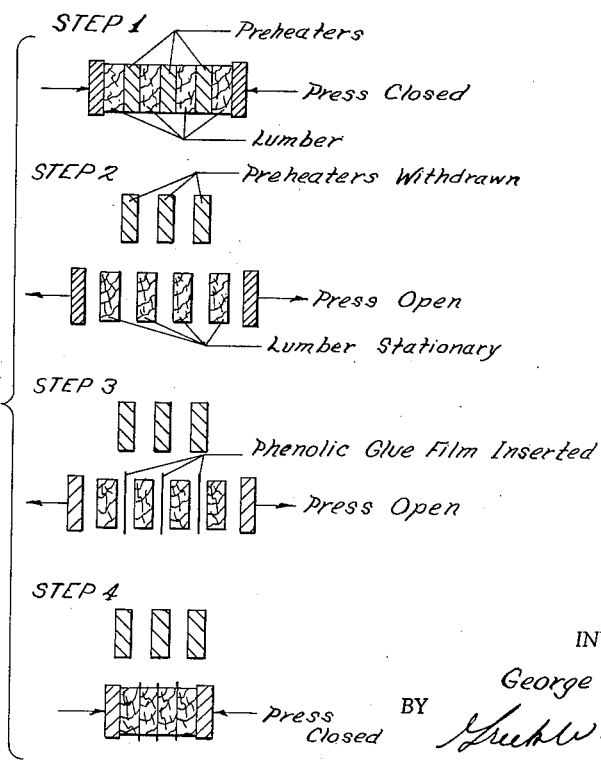
INVENTOR.
George G. Marra
BY
Atty.

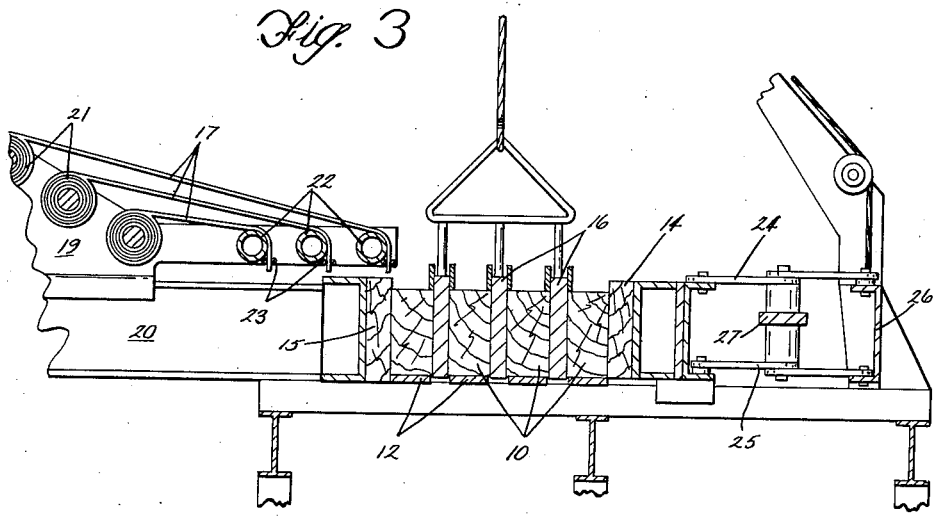
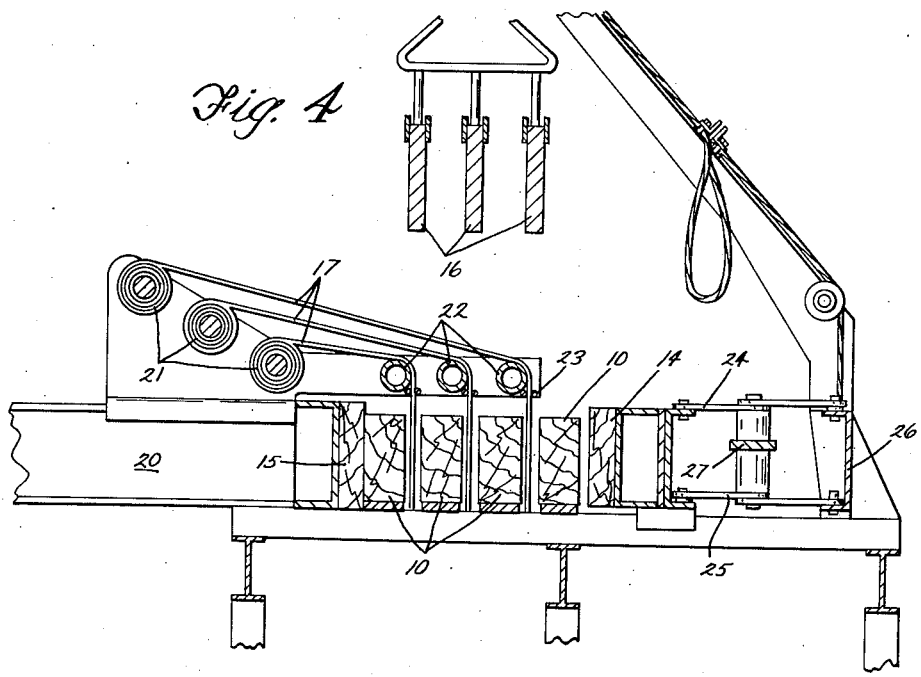

May 29, 1962
G. G. MARRA
3,036,947
METHOD OF LAMINATING WOOD TIMBERS
Filed Sept. 28, 1959
4 Sheets-Sheet 4
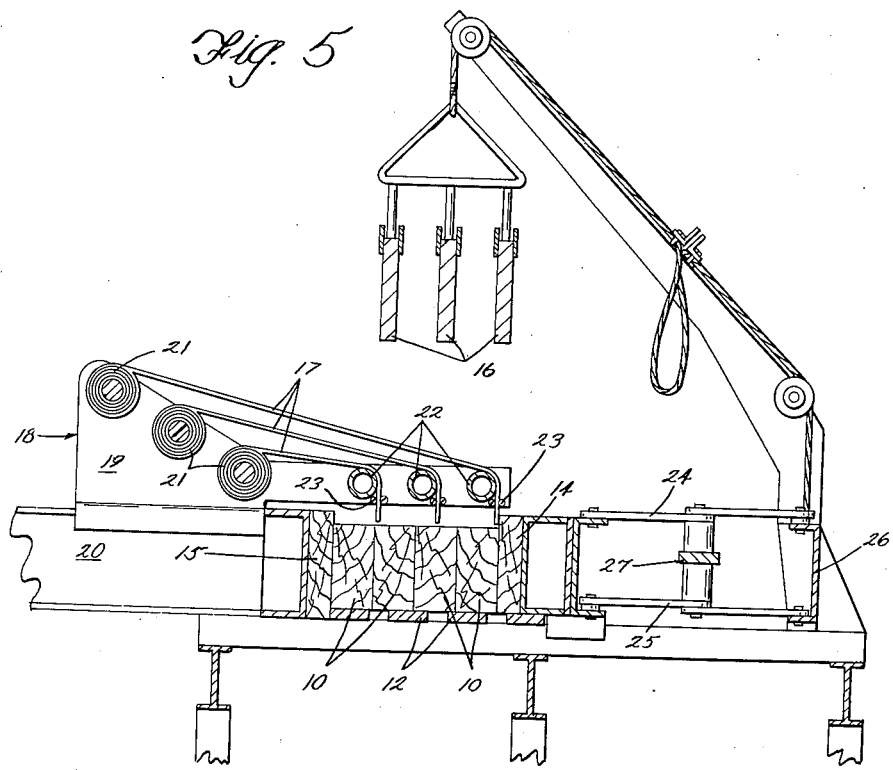
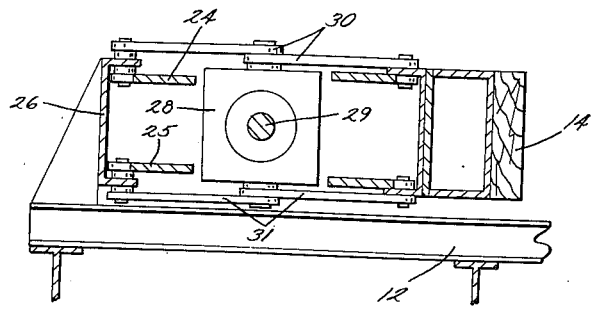
INVENTOR.
George G. Marra
BY
*Frank Wells*
Atty.

United States Patent Office 3,036,947
Patented May 29, 1962

3,036,947
METHOD OF LAMINATING WOOD TIMBERS
George G. Marra, Pullman, Wash., assignor to Washington State University, Pullman, Wash.
Filed Sept. 28, 1959, Ser. No. 843,013
5 Claims. (Cl. 156—321)

This invention relates to a method of laminating wooden timbers. The primary purpose of this invention is to provide such a method whereby a multiplicity of pieces or laminations may be adhered to each other with a weatherproof adhesive in a fraction of the time heretofore required.

The laminating of timbers is a general process of adhering lumber of certain dimensions together in face-to-face relation to achieve sizes substantially larger than normal solid timbers, or to achieve a variety of other advantages such as reduced checking and warping, greater strength, and materials economy. Because of their characteristics laminated timbers have enjoyed wide acceptance in many construction applications in spite of high cost of manufacture. It appears that much wider application would result from a significant cost reduction in such products.

The conventional glues used in lumber laminations are of two general types i.e. interior and exterior. The interior type is usually a casein glue which may be used only when the beams in service will be under dry conditions. The exterior type is either resorcinol or a mixture of resorcinol and phenol and may be used under exterior conditions. All these glues will eventually cure at normal room temperatures although both the resorcinol and the resorcinol-phenol mixtures are recognized as achieving more complete cures at elevated temperatures, preferably over 110 degrees F. The casein glues will cure at temperatures below 70 degrees F., a feature of some importance in many laminating establishments. Straight phenol glues are also excellent in the exterior category but these glues have had less use in lumber beam laminating because of the necessity for high temperatures for curing. According to the present invention straight phenol glues may be used and are preferred.

The costs of these glues on a dry basis is about as follows: the cost of phenol is 2 to 3 times the cost of casein, and resorcinol is about 2 times the cost of phenol. The ratio of the cost of glue as actually applied, however, varies considerably depending upon the efficiency of the operation. In the practice of the present method the cost of glue used is about the same as the cost of casein glue in conventional practice of laminating wooden timbers, but the results attained are in the quality class of resorcinol glues.

It will be evident that exterior type glues are of primary concern because of the unlimited field of use of timber laminated with such glues. Comparisons must thus be made with conventional practice using these exterior type glues.

The crux of the problem in conventional laminating of wooden timbers has been largely the extended time during which the timbers had to be maintained under pressure for adequate curing of the glue. Under conventional methods with which I am familiar the time required for a partial cure varies from 6 to 96 hours depending upon the size of members, the degree of curvature, and ambient conditions. During this time the beams must remain under full pressure thus severely limiting the output of the pressure devices. Following the pressure period beams have been held for days for further conditioning and cure of the glue before final machining could be accomplished.

A more specific purpose of the invention is to provide a method which eliminates the extended pressure time for forming laminated wooden timbers and which limits the movement of the timbers to a minimum, thus effecting considerable saving in time and labor costs.

In practicing the present method advantage is taken of the known method of storing heat in all the meeting faces of the lumber. In addition the heat is brought to the lumber and thereafter the phenol glue is brought between the heated faces with a minimum of motion. The curing is accomplished under pressure, and, by virtue of the stored heat, in a short time.

The nature and advantages of the invention will appear more fully from the following description and the accompanying drawings which diagrammatically illustrate the method:

In the drawings:

FIGURE 1 is a somewhat diagrammatic plan view illustrating the placing of the several lumber pieces to be laminated;

FIGURE 2 is a diagrammatic cross sectional view on the line 2—2 of FIGURE 1 illustrating the initial relation of the pieces, the heating means and the glue inserting devices;

FIGURE 3 is a view similar to FIGURE 2 showing the application of heat to the faces of the pieces;

FIGURE 4 is a view similar to FIGURE 2 showing the application of glue between the faces of the pieces;

FIGURE 5 is a view similar to FIGURE 2 showing the final pressing step;

FIGURE 6 is an enlarged fragmentary sectional view taken on the line 6—6 of FIGURE 1; and FIGURE 7 is a diagrammatic view illustrating the several method steps.

In carrying out the method the several laminations or timber pieces 10 are moved endwise into spaced relation parallel to each other over conveyor rolls 11 on to a platform 12. Suitable retractable guide members 13 (not shown) are used to guide the pieces 10 into the position shown in FIGURES 1 and 2. In this position the pieces 10 are spaced apart between two press heads 14 and 15. A plurality of plate heaters 16 are mounted to move up and down between their raised position illustrated in FIGURE 2 and lamination surface heating position between the pieces 10 shown in FIGURE 3.

In the first step of the process the heaters 16 are clamped between the pieces 10 by closing the press head 14 slightly and held there at a temperature of about 385 degrees F. for a period of time sufficient to store the necessary heat in the faces of the pieces 10 that contact the heaters 16. Up to five minutes may be needed.

The pressure is then released from the pieces, the heaters 16 are raised and sheets or webs 17 of phenolic resin glue are fed down between the heated faces of the pieces 10 by a retractable feeding means 18. Sheets of thermosetting adhesive are well known in the prior art. See, for example, the book Modern Plywood by Thomas D. Perry, published by Pitman Publishing Corporation, copyright 1942, pages 6, 16, 54 and 64. See also Reichhold Chemicals Inc., Bulletin No. W-P-10, dated March 24, 1959, published by Reichhold Chemicals Inc., P.O. Box 3547, Seattle, Washington. As soon as the sheets are in place the press head 14 is closed against the pieces 10 pressing them together under full pressure.

The steps of removing the heaters, inserting the sheets of phenolic resin glue, and closing the press to full pressure must be accomplished rapidly and the total time for these three steps should not exceed ten seconds.

The full pressure must be maintained against the assembled pieces long enough to achieve adequate cure of the resin. Since the faces contacting the phenol resin sheet are already at a temperature of the order of 360–385 degrees F. when they engage the sheet, the sheet receives heat and pressure simultaneously and practically instantaneously.

The pressure employed depends upon the species being glued and varies from 100 p.s.i. for low density species, such as western red cedar, to 200 p.s.i. for higher density species such as Douglas fir. Full pressure maintained for one minute is enough to achieve adequate cure of the resin.

With this method the speed at which the laminated wooden timbers are formed is limited mainly by the time it takes to bring the meeting faces of the pieces up to the necessary temperature. This time of heating is actually, greater that the total elapsed time of removing the heaters, inserting the resin sheets, apply the pressure and effecting the cure.

The mechanisms necessary to carry out the method may be varied somewhat. A typical resin sheet handling mechanism 18 is illustrated as a reciprocable frame 19 on cross beams 20 which frame carries supply rolls 21 for the resin sheets, feed rolls 22 and guides 23 for advancing the resin sheets. As illustrated in FIGURES 2 and 3 the frame 19 is retracted to clear the way for the heaters 16 while in FIGURES 4 and 5 the frame 19 is advanced to bring the resin sheets in alignment with the spaces between pieces 10 vacated by the heaters 16. The resin sheets do not need to be cut off. The heat of the faces of the pieces 10 just softens the resin to a fluid state when it comes in contact with the faces and that effects the cut-off of the resin. Any projecting resin is removed in the machining of the timbers after they are formed.

The simple press closing mechanism shown comprises two series 24 and 25 of links pivotally connected respectively to the movable press head 14 and a fixed beam 26. A bar 27 has the links 24 and 25 pivoted to it. A hydraulic cylinder 28 has its piston rod 29 connected to the bar 27 and the cylinder is connected to pairs 30 and 31 of links that are also pivoted to the head 14 and the beam 26 so that when the piston rod 29 is drawn into the cylinder 28 the head 14 must move away from the beam 26.

The mechanisms just described are merely illustrative. It is obvious that equivalent means may be used to open and close the press, and to place the heaters and thermosetting phenolic resin glue sheets between the several laminations or pieces of wood. The essential elements for carrying out the method are; the heating platens or heaters 16, one for each glue line and must be the width or length of the surfaces to be glued together, the device for carrying the sheet of thermosetting glue with means to interpose this sheet between the heated faces, some means to hold the laminations in position during the interval of time between removal of the heaters and interposition of the glue sheet and, a device for quickly closing the several laminations against the sheets and applying full pressure throughout the length and width of the glue receiving faces.

One of the unique featuers of this method of laminating wooden timbers is the application of both heat and pressure practically simultaneously and instantaneously to the previously solid thermosetting resin. It is believed that this is an important factor in obtaining the good bonding action between the hot, bone dry wood and the solid resin. The resin actually melts i.e. becomes fluid in place and then sets up by polymerization. Apparently under these particular conditions the fleeting, heat-induced flow period of the resin is just adequate to secured penetration in and anchorage to the wood fibers before the rapid polymerization action sets in. The quality of the resulting bonds, as measured by standard testing procedures, is excellent.

Tests were conducted using four 1 x 6 quarter grain Douglas fir laminae. The four pieces were all obtained from one high density board and were planed before laminating to remove surface dirt and grease. The standard procedure hereinbefore was used with a total elapsed cycle time from the insertion of heaters between the boards until release of pressure of seven minutes. Testing followed the procedures described in Technical Bulletin 1069 U.S. Department of Agriculture, pages 82–87.

The three glue lines were tested by the shear block test method both dry and after 12 hours boil. Shear specimens were taken from both the edge and center of the beam in order to reveal the presence or absence of edge effects. Shear tests were also made in the wood between the glue lines as a means of sharpening the appraisal of gluing efficiency. Test results were as follows:

*Dry Shear Test Results*

|  | Average Shear Strength, p.s.i. | Average Wood Failure, Percent | Number of Tests |
| --- | --- | --- | --- |
| Glue line No. 1 | 1,577 | 77 | 12 |
| Glue line No. 2 | 1,790 | 80 | 12 |
| Glue line No. 3 | 1,733 | 70 | 12 |
| Beam edge | 1,720 | 75 | 18 |
| Beam center | 1,673 | 76 | 18 |
| Grand Average | 1,696 | 75 |  |
| Wood between Glue lines | 1,660 |  | 6 |
| Technical Bulletin No. 1069 requirement | 1,100 | 50 |  |

*Wet Shear Test After Twelve Hours Boil*

|  | Average Shear Strength, p.s.i. | Average Wood Failure, Percent | Number of Tests |
| --- | --- | --- | --- |
| Glue line No. 1 | 895 | 84 | 12 |
| Glue line No. 2 | 868 | 84 | 12 |
| Glue line No. 3 | 847 | 88 | 12 |
| Beam edge | 837 | 85 | 18 |
| Beam center | 903 | 86 | 18 |
| Grand Average | 870 | 85 |  |
| Wood between Glue lines | 760 |  | 6 |
| Technical Bulletin No. 1069 requirement | 755 | 75 |  |

As can be seen from the above list results, glue line efficiencies when compared to the strength of the wood, were very good and well above the standards set forth in Technical Bulletin 1069.

Standard 12 day cyclic delamination tests were also made with the following results.

| Sample No. | Total length of End grain glue line, inches | Total length of delamination, inches | Percent delamination |
| --- | --- | --- | --- |
| 1 | 31.1 | 1.1 | 3.5 |
| 2 | 30.3 | 0.6 | 2.0 |
| 3 | 29.3 | 0.9 | 3.1 |
| Total | 90.7 | 2.6 |  |
| Average |  |  | 2.9 |

Note.—Technical Bulletin No. 1069 requirement less than 10 percent

These tests show that the wooden timbers laminated according to the foregoing method had a satisfactory level of bond quality under all test conditions. There appeared to be no significant difference between the edge and center of the beam.

It is believed that the nature and advantages of my invention will be clear from the foregoing description.

Having described my invention I claim:

1. A method of laminating wooden timbers which comprises placing a plurality of wood boards in side by side spaced position, moving heaters between the boards and pre-heating the adjacent faces of the boards above the thermosetting temperature of the adhesive to be used in bonding the boards together, removing the heaters and placing sheets of thermosetting adhesive between the boards, pressing the boards and sheets together thereby fluidizing the adhesive and curing the adhesive by means of the heat stored in the faces of the boards.

2. A method of laminating wooden timbers utilizing a thermosetting adhesive, comprising the successive steps of aligning a plurality of natural wood boards in side by side spaced relation, placing heaters in the spaces between the boards, pressing the assembly sidewise to preheat the inner board surfaces above the thermosetting temperature of the bonding adhesive, removing the heaters and placing sheets of thermosetting bonding adhesive between the boards, and again pressing the assembly sidewise to thereby melt and cure the thermosetting adhesive film by means of the heat retained in the board surfaces.

3. A method of producing laminated wooden timbers bonded by thermosetting adhesive comprising the successive steps of aligning a plurality of natural wood boards in side by side spaced position in a press, moving surface heaters into the spaces between the boards, the surface area of the heaters corresponding to the adjacent board surface area, pressing the assembly sidewise to insure contact between the heaters and inner board surfaces to thereby pre-heat the inner board surfaces above the thermosetting temperature of the adhesive to be applied, then quickly releasing the press removing the heaters, inserting a sheet of thermosetting adhesive between adjacent inner board surfaces and again pressing the assembly sidewise to thereby melt and cure the bonding adhesive by means of the retained inner board surface heat.

4. A method of laminating wooden timbers which comprises placing a plurality of wood boards in side by side spaced position, moving heaters between the boards and pre-heating the adjacent faces of the boards above the thermosetting temperature of the adhesive to be used in bonding the boards together, removing the heaters and placing sheets of thermosetting adhesive between the spaced apart boards, then pressing the boards against each other thereby simultaneously applying the adhesive and pressure to the heated faces of the boards.

5. A method of laminating wood timbers utilizing a thermosetting adhesive comprising the preheating of the meeting faces of a plurality of boards to a temperature at least equal to the thermosetting temperature of the adhesive to be used in bonding the boards together, then pressing the opposed faces upon a sheet of the thermosetting adhesive, thereby applying simultaneously and instantaneously both pressure and heat to the adhesive, effecting a wetting of the faces of the boards by the adhesive as it rises to thermosetting temperature due to the heat stored in the faces of the boards.

References Cited in the file of this patent
UNITED STATES PATENTS

| | | |
|---|---|---|
| 1,999,509 | Merritt | Apr. 30, 1935 |
| 2,344,488 | Bowling | Mar. 21, 1944 |
| 2,729,584 | Foster | Jan. 3, 1956 |